Figure 1:
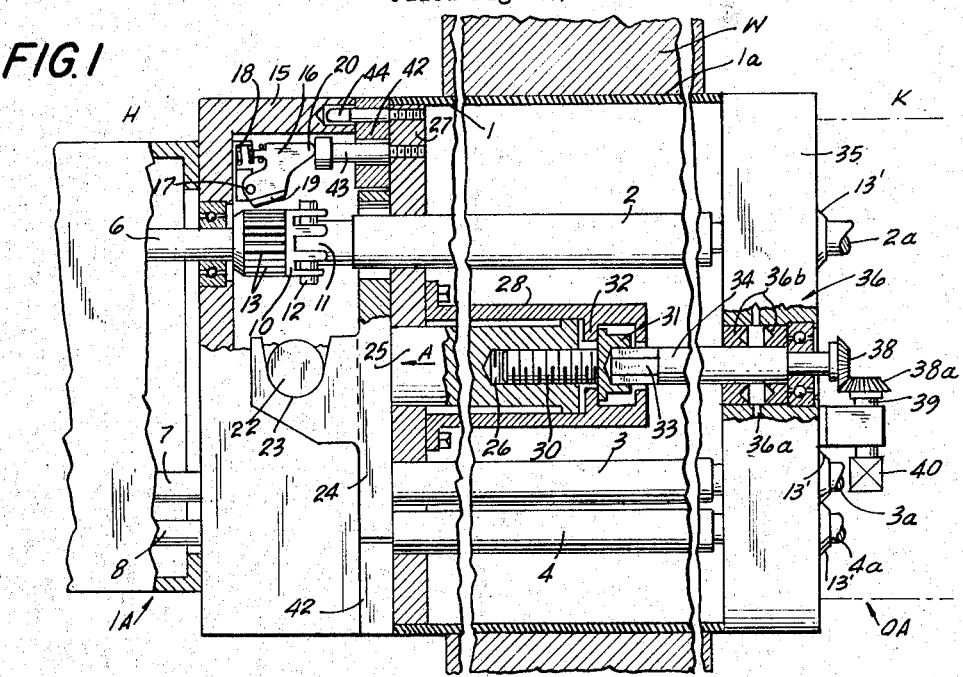

Jan. 17, 1967  H. WÄLISCHMILLER  3,298,484
BRAKE AND COUPLING APPARATUS
Filed Aug. 19, 1964

INVENTOR
HANS WÄLISCHMILLER
BY
Michael J. Striker
ATTORNEY

United States Patent Office 3,298,484
Patented Jan. 17, 1967

3,298,484
BRAKE AND COUPLING APPARATUS
Hans Wälischmiller, am Furstenhausle 8,
Meersburg am Bodensee, Germany
Filed Aug. 19, 1964, Ser. No. 390,543
Claims priority, application Germany, Aug. 21, 1963,
W 35,133
17 Claims. (Cl. 192—8)

The present invention relates to apparatus for transmitting motion from a first area to a second area, particularly from a safe area to a dangerous area. More particularly, the invention relates to improvements in and further developments of an apparatus of the type disclosed in my copending application Serial No. 276,401, filed April 29, 1963.

When dealing with radioactive substances or with atmospheres having toxic gases or toxic dust particles suspended therein, the operating personnel must be fully protected from the dangerous areas and any operations which must be performed in such areas are carried out by remote control, normally through a wall which separates the dangerous area from a safe area. My aforementioned application Serial No. 276,401 deals with an apparatus which is used to transmit motion from the safe area, through a separating wall structure, and into a dangerous area, and more particularly with improved sealing means which may be used to prevent passage of radioactive, toxic or other harmful substances through one or more openings provided in the separating wall. As a rule, the motion transmitting apparatus comprises one or more rotary motion transmitting elements in the form of shafts, spindles or the like because such rotary parts may be sealed more accurately than parts which are not of circular outline. Also, the wear on rotary parts is normally less than the wear on parts which reciprocate or perform other types of movements. The shafts are rotated by an outer arm which is mounted in the safe area and whose component parts drive the parts of an inner arm which is mounted in the dangerous area so that the inner arm may duplicate the movements of the outer arm. It was found that serious problems arise when the two arms are disconnected from each other because certain component parts of one arm might become misaligned and cannot be reengaged with the corresponding parts of the other arm.

Accordingly, it is an important object of the present invention to provide a motion transmitting apparatus wherein the movable parts of the inner (concealed) arm are automatically arrested or blocked in response to disengagement from the corresponding parts of the outer (accessible) arm so that the inner arm cannot perform any uncontrolled gripping, raising, turning or other movements.

Another object of the invention is to provide an apparatus of the just outlined characteristics wherein not only the movable parts of the inner arm but also the movable parts of the outer arm may be blocked or arrested in a fully automatic way as soon as the two arms are disengaged from each other to make sure that the movable parts of one arm remain in requisite position for automatic reengagement with the corresponding parts of the other arm whenever the operators decide to reengage the two arms.

A further object of the invention is to provide a novel coupling and uncoupling assembly which may be used in the improved apparatus to rapidly and automatically connect or disengage the movable parts of the two arms.

An additional object of the invention is to provide a motion transmitting apparatus of the above outlined characteristics wherein the inner arm may be readily detached from its supporting structure to undergo inspection, repair and/or other treatment and wherein the inner arm automatically assumes an optimum position for reengagement of its parts with the corresponding parts of the outer arm as soon as it is reattached to its supporting structure.

Another object of the present invention is to provide a motion transmitting apparatus which is particularly, but not exclusively, suited for transmitting motion from a safe area to a dangerous area, and wherein the transmission of motion may be started, terminated, carried on and/or adjusted with little loss in time and with the assistance of exceptionally simple, rugged, compact and reliable instrumentalities such as are necessary in areas where the parts of the apparatus are exposed to corrosive or other undesirable influences.

A concomitant object of the invention is to provide a motion transmitting apparatus wherein the movable parts of one arm are automatically blocked not later than at the time the other arm is disconnected therefrom so that any, even minimal, angular or other displacements of corresponding parts on the two arms are prevented in a fully automatic way and for as long as the two arms remain disengaged from each other.

A further object of my invention is to provide a motion transmitting apparatus which may transmit a single type of motion or two or more types of motion, and wherein each type of motion may be transmitted simultaneously with or independently of one or more additional motions.

Another object of the invention is to provide a motion transmitting apparatus wherein the inner arm may be disconnected from the outer arm within exceptionally short periods of time and is then ready to be detached from its supports in order to eliminate any defects in its motion receiving mechanism.

An additional object of the invention is to provide an apparatus of the above outlined characteristics wherein the movable parts of the inner arm may be blocked regardless of whether the inner arm is mounted in or detached from its support.

With the above objects in view, one feature of the present invention resides in the provision of an apparatus for transmitting motion from a first area to a second area, particularly for transmitting motion from a safe area to a dangerous area. The apparatus comprises a wall which is situated between and separates the two areas from each other, a first and a second control arm or a similar control member respectively located in the first and second areas, a carrier forming part of the second control member and adjacent to the corresponding side of the wall, a driven shaft rotatably supported by the carrier, motion transmitting means including a second shaft extending from the first control member through the wall and having an end portion adjacent to and coaxial with the driven shaft, reciprocating means including an actuating member which is accessible by being located in the first area and serves to move the carrier and the driven shaft axially toward or away from the second shaft, coupling means comprising a notched head and a cross pin or similar cooperating coupling elements provided on the two shafts and arranged to establish a driving connection between the shafts in response to movement of the carrier toward the second shaft, and blocking means including a ratchet and pawl unit or similar blocking elements for normally holding the driven shaft against rotation with reference to the carrier. In accordance with an important feature of my invention, the blocking means releases the driven shaft in response to movement of the carrier toward the second shaft so that the driven shaft is released at the time it is coupled to the second shaft whereby the second shaft may rotate the driven shaft to enable the second control member to duplicate raising, turning, gripping or other movement of the first control member.

As a rule, the second control member will comprise two or more driven shafts and the motion transmitting means will include an equal number of shafts each of which may be coupled to or uncoupled from the corresponding driven shaft in response to axial displacements of the carrier. It is often desirable to provide additional blocking means so as to prevent rotation of motion transmitting shafts at the time such shafts are disengaged from the driven shafts so that, during such disengagement, the angular positions of all shafts may remain unchanged.

Figure 2:
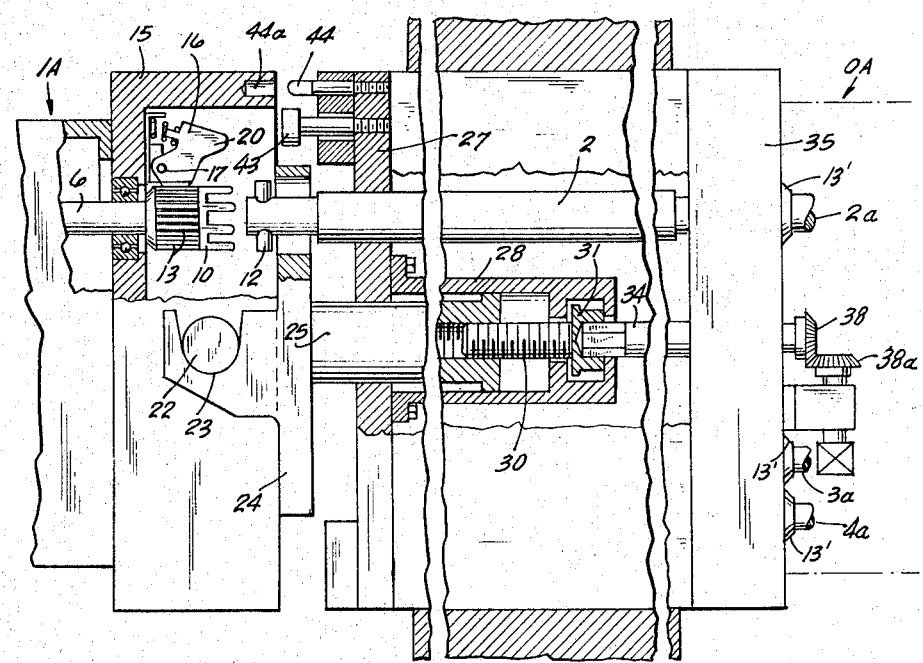

The novel features which are considered as characteristic of the invention are set forth in particular in the appended claims. The improved motion transmitting apparatus itself, however, both as to its construction and its mode of operation, together with additional features and advantages thereof, will be best understood upon perusal of the following detailed description of a specific embodiment with reference to the accompanying drawings, in which:

FIG. 1 is a sectional view of a motion transmitting apparatus which is constructed in accordance with the present invention, the inner arm being shown in a position its parts assume when they are operatively connected with the corresponding parts of the outer arm; and FIG. 2 is a similar section through the apparatus but showing the inner arm in a position in which its parts are disengaged from the parts of the outer arm.

Referring to the drawings, there is shown an apparatus for transmitting motion form a safe first area K to a dangerous second area H. These areas are separated by a wall W having a pair of opposed sides whereby the left-hand side faces the dangerous area H. The wall W is provided with an opening or passage 1a sealingly receiving an outer tubular housing 1 which accommodates parts serving to transmit motion from an outer control member or arm OA in the safe area K to an inner control member or arm IA in the dangerous are H so that the inner control arm may duplicate gripping, raising, turning or other movements of the outer control arm OA. The motion transmitting parts include three parallel intermediate shafts 2, 3, 4 which are sealingly received in the tubular housing 1 in a manner as disclosed in my copending application Serial No. 276,401. The left-hand end portions of the intermediate shafts 2-4 extend into the dangerous area H and may be coupled to three driven shafts 6, 7, 8 which are mounted in the inner control arm IA and serve to initiate certain movements of the latter. The connecting or coupling assemblies between the end portions of the shafts 2-4 and 6-8 are of identical construction and one thereof is illustrated in full detail. Thus, the driven shaft 6 comprises a terminal portion or boss 10 which constitutes a first coupling element and whose end face is provided with axially extending open-ended notches 11. Each notch is located diametrically opposite a second notch so that the pairs of cooperating notches may receive the ends of a second coupling element in the form of a cross pin 12 which is secured to the intermediate shaft 2. The boss 10 is further provided with a ratchet wheel 13 having a series of axially extending peripheral grooves or flutes and this ratchet constitutes a blocking element forming part of a blocking device which serves to prevent uncontrolled angular displacements of the driven shaft 6. The blocking device for the driven shaft 6 further comprises a second blocking element here shown as a rockable pawl 16 having a wedge-like or blade-like tang 19 which may enter and then fills one of the flutes on the ratchet 13, and which is rockable about a horizontal pivot 17 whose axis is perpendicular to the axis of the intermediate shaft 2. The pivot 17 is mounted in a cylindrical carrier or head 15 of the inner arm IA and the pawl 16 is biased by a helical spring 18 which tends to keep the tang 19 in one of the flutes. A projection or nose 20 of the pawl 16 may be engaged by a rocking pin 43 which serves to pivot the pawl against the bias of the spring 18 and to thereby release the driven shaft 6. The shafts 6-8 are rotatable in the head 15 and the coupling means between the shafts 3, 7 and 4, 8 are identical with the coupling means between the shafts 2, 6. When the shafts 2-4 are disengaged from the shafts 6-8, the latter shafts are automatically held against any angular movements because the pawls 16 then cooperate with the respective ratchets 13 (see FIG. 2). In other words, the inner arm IA is blocked against any gripping, raising, turning or other movements as soon as its shafts 6-8 are uncoupled from the intermediate shafts 2-4.

The head 15 is open at that side which faces the wall W and is provided with two coaxial radially outwardly extending pins 22 (only one shown) which are supported in bearings here shown as hook-shaped cradles 23 forming part of a holder 24. This holder is reciprocable axially at the dangerous side H of the wall W and serves to move the head 15 back and forth in the axial direction of the shafts 2-4 and 6-8. The means for reciprocating the holder 24 includes a plunger 25 whose axis is parallel with the axes of the shafts 2-4 and which is reciprocable in an inner sealing plate 27 secured to the left-hand end of the tubular housing 1. This sealing plate 27 carries a guide cylinder 28 which is bolted or otherwise secured thereto and extends into the interior of the tubular housing 1 to guide the plunger 25 in its movements toward and away from the dangerous area H. The plunger has an end portion provided with a tapped axial bore 26 which receives the tip of a threaded spindle 30 having an enlarged portion 31 abutting against an internal collar or stop 32 of the cylinder 28 so that the spindle is held against axial movement. The enlarged portion 31 is provided with a central bore of non-circular outline and receives the non-circular end 33 of a shaft 34 which extends through and beyond the outer end wall of the cylinder 28 and carries a bevel gear 38 meshing with a second bevel gear 38a on a shaft 39 which is provided with a readily accessible square actuating head 40. This actuating head 40 may be rotated from the safe area K by means of a crank handle or by the output shaft of a suitable motor to rotate the spindle 30 whereby the plunger 25 is compelled to move axially and to shift the head 15 toward or away from the sealing plate 27, i.e., toward or away from the adjacent end portions of the shafts 2-4. The shaft 34 extends through an annular sealing device 36 which is provided in an outer sealing plate 35 adjacent to and connected with the right-hand end of the tubular housing 1. The sealing device 36 is constructed in a manner substantially as disclosed in my application Serial No. 276,401 and defines an oil chamber which is supplied with oil through a radial bore 36a. The chamber is bounded by two deformable sealing rings 36 which bear against the periphery of the shaft 34 and against the adjacent internal surface of the outer sealing plate 35 to prevent escape of gases, liquid or dust from the dangerous area H. The shaft 34 actually constitutes a detachable extension of the spindle 30.

FIG. 1 illustrates the apparatus in operative position when the intermediate shafts 2-4 may rotate the corresponding driven shafts 6-8. The plunger 25 is retracted into the guide cylinder 28 so that the holder 24 abuts against the inner sealing plate 27 and the cross pins 12 of the intermediate shafts extend into pairs of notches 11 on the driven shafts 6-8. The open end of the head 15 abuts against segmental stops 42 on the inner sealing plate 27. The rocking pins 43 (which are screwed into the stops 42) engage the corresponding projections 20 to keep the tangs 19 away from the flutes of the ratchets 13, i.e., the blocking devices are idle and the shafts 6-8 are free to rotate in response to rotation of the intermediate shafts 2-4.

If the operators desire to disengage the driven shafts 6-8, the actuating head 40 is rotated manually (by a crank handle) or by a suitable motor to rotate the spindle 30 in a direction necessary to move the plunger 25 to the left, as viewed in FIG. 1 (see the arrow A), whereby the holder 24 entrains the head 15 and shifts the driven shafts 6–8 to the positions shown in FIG. 2. The bosses 10 are moved away from the cross pins 12 so that the driving connection between the shafts 2–4 and 6–8 is terminated. At the same time, the rocking pins 43 release the corresponding noses 20 so that the springs 18 are free to expand and pivot the pawls 16 in a sense to move each tang 19 into a flute of the corresponding ratchet wheel 13. Thus, the blocking action takes place during disengagement of driven shafts 6–8 from the intermediate shafts 2–4, which means that the driven shafts remain in angular positions in which a pair of notches 11 on each boss 10 is in registry with the corresponding cross pin 12.

The mounting of the blocking devices is preferably such that the pawls 16 engage the respective ratchet wheels 13 even before the cross pins 12 are disengaged from the respective bosses 10 so that the shafts 6–8 are held against rotation prior to actual disengagement from the intermediate shafts 2–4. This insures that the rotary parts of the inner control arm are positively held against any angular displacement (for example, under the action of gravity) not later than at the time the driven shafts are disconnected from the intermediate shafts. The head 15 is supported by the holder 24 which in turn is supported by the plunger 25, this plunger being supported and guided by the cylinder 28 and inner sealing plate 27.

Once the head 15 is moved to the position of FIG. 2, the outer control arm OA may be repaired, inspected, adjusted or otherwise manipulated without influencing the inner control arm IA. All that the operators have to do in order to reestablish the operative connection between the control arms OA and IA is to rotate the shaft 39 so that the head 15 is returned to the position of FIG. 1 in which the blocking devices are idle and the coupling devices automatically establish a driving connection between each intermediate shaft and the corresponding driven shaft.

The stops 42 are provided with guide pins 44 which enter complementary apertures 44a in the end face of the head 15 when the latter is moved to the position of FIG. 1. In the position of FIG. 2, the weight of the head 15 (and of the entire inner control arm IA) is carried by the holder 24 which in turn is carried by the plunger 25. The plunger 25 is supported at two spaced points, namely, by the inner sealing plate 27 and by the guide cylinder 28. If necessary, the entire inner control arm IA may be detached from the holder 24 by resorting to a crane or to another suitable lifting device whose hooks engage the radial pins 22 and move them out of the sockets of the cradles 23. Such removal of the inner control arm IA may be effected when the head 15 is in the position of FIG. 2 in which the guide pins 44 are spaced from the complementary apertures 44a. During such separation of the head 15 from the holder 24, the driven shafts 6–8 remain blocked because the pawls 16 engage the respective ratchet wheels 13.

The above outlined operation is repeated in reverse when the inner control arm IA is reconnected with the holder 24. The head 15 is then ready to be moved back to the position of FIG. 1 in order to reconnect the bosses 10 with the cross pins 12 so that the driven shafts 6–8 are ready to rotate in response to rotation of the corresponding intermediate shafts. All that is necessary is to rotate the shaft 39 in a sense to withdraw the plunger 25 into the guide cylinder 28 so that the holder 24 returns into abutment with the inner sealing plate 27. The pins 44 reenter the apertures 44a and prevent angular displacement of the head 15. As the plunger 25 advances in a direction counter to that indicated by the arrow A, the heads of the rocking pins 43 engage the noses 20 and pivot the pawls 16 in a counterclockwise direction, as viewed in FIG. 2, so that the springs 18 are compressed and the tangs 19 move away from the respective ratchet wheels 13. Thus, the driven shafts 6–8 are unblocked not later than at the time the cross pins 12 reenter the pairs of momentarily aligned notches 11 whereby the inner control arm IA is ready to perform one or more functions in response to rotation of one or more intermediate shafts 2–4. These intermediate shafts are coupled to driver shafts 2a, 3a, 4a of the outer control arm OA which in turn are rotatable by well known devices in a manner not forming part of the present invention.

In order to prevent uncontrolled angular displacements of the intermediate shafts 2–4 when the cross pins 12 are disengaged from the corresponding bosses 10, the apparatus preferably compresses additional blocking devices which hold the intermediate shafts 2–4 and/or the driver shafts 2a–4a against rotation. Such blocking devices may be identical with the blocking devices for the driven shafts 6–8. The ratchet wheels 13' of the additional blocking devices are shown in each of FIGS. 1 and 2, and these blocking devices insure that the intermediate shafts 2–4 remain in angular positions in which the cross pins 12 are invariably aligned with pairs of notches 11 even if the head 15 is in the position of FIG. 2. It is clear that the blocking devices which are shown in the drawings may be replaced by other types of blocking devices, for example, by suitable brakes or the like. Each of the blocking devices for the shafts 2–4 or 2a–4a may be operated individually, but I prefer to operate them simultaneously so that a single manipulation will suffice to block or unblock the intermediate shafts 2–4 and/or the driver shafts 2a–4a. For the purposes of the present invention, the shafts 2–4 may be considered as being integral with the shafts 2a–4a, respectively.

It is to be noted that the apparatus of my invention is equally useful in establishments other than nuclear reactor plants or the like, e.g., in plants where the area H need not be fully sealed from the area K. In such apparatus, the driver shafts and the driven shafts must be mounted only in the heads of the respective control arms.

The flutes on the ratchet wheels 13 are preferably closely adjacent to each other so that the driven shafts 6–8 are held against any, even minimal, angular displacements as soon as the springs 18 are free to expand. Also, the spindle 30 which meshes with the plunger 25 is of the self-locking type so that the plunger 25 is positively held in a selected axial position unless the operator decide to rotate the actuating head 40 in a clockwise or counterclockwise direction. Thus, there is no need to provide a special locking device which would keep the head 15 of the inner control arm IA against undesirable axial displacements. The head 40 is readily accessible and remains on the outer sealing plate even if the outer control arm OA must be removed for the purposes of inspection, cleaning, adjustment or repair. The plunger 25 is preferably coaxial with the head 15.

Without further analysis, the foregoing will so fully reveal the gist of the present invention that others can, by applying current knowledge readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for transmitting motion from a first area to a second area, in combination, a wall situated between and separating said areas from each other; a first and a second control member respectively located in said first and second areas, said second control member comprising a carrier adjacent to said wall and a driven shaft rotatably supported by said carrier; motion transmitting means including a second shaft extending from said first control member through said wall and having an end portion coaxial with and adjacent to said driven shaft; reciprocating means including an actuating member located in said first area for moving said carrier and said driven shaft axially toward and away from said second shaft; coupling means comprising cooperating coupling elements provided on said shafts and arranged to establish a driving connection between the shafts in response to movement of said carrier toward said second shaft; and blocking means for normally holding said driven shaft against rotation with reference to said carrier and being operative to release said driven shaft in response to movement of said carrier toward said second shaft so that the driven shaft is released at the time it is coupled to said second shaft.

2. In an apparatus for transmitting motion from a first area to a second area, in combination, a wall situated between and separating said areas from each other; a first and a second control member respectively located in said first and second areas, said second control member comprising a holder adjacent to said wall, a carrier mounted on said holder, and a driven shaft rotatably supported by said carrier; motion transmitting means including a second shaft extending from said first control member through said wall and having an end portion coaxial with and adjacent to said driven shaft; reciprocating means including an actuating member located in said first area for moving said holder together with said carrier and said driven shaft axially toward and away from said second shaft; coupling means comprising cooperating coupling elements provided on said shafts and arranged to establish a driving connection between the shafts in response to movement of said holder toward said second shaft; and blocking means for normally holding said driven shaft against rotation with reference to said carrier and being operative to release said driven shaft in response to movement of said holder toward said second shaft so that the driven shaft is released at the time it is coupled to said second shaft.

3. In an apparatus for transmitting motion from a first area to a second area, in combination, a wall situated between and separating said areas from each other; a first and a second control member respectively located in said first and second areas, said second control member comprising a carrier adjacent to said wall and a driven shaft rotatably supported by said carrier; motion transmitting means including a second shaft extending from said first control member through said wall and having an end portion coaxial with and adjacent to said driven shaft; reciprocating means including an actuating member located in said first area for moving said carrier and said driven shaft axially toward and away from said second shaft; coupling means arranged to establish a driving connection between said shafts in response to movement of said carrier toward said second shaft, said coupling means comprising a terminal portion provided on one of said shafts and having open axially extending notches facing the other shaft, and a cross pin secured to the other shaft and extending into momentarily aligned notches of said terminal portion; and blocking means for normally holding said driven shaft against rotation with reference to said carrier and being operative to release said driven shaft in response to movement of said carrier toward said second shaft so that the driven shaft is released at the time it is coupled to said second shaft.

4. In an apparatus for transmitting motion from a first area to a second area, in combination, a wall situated between and separating said areas from each other; a first and a second control member respectively located in said first and second areas, said second control member comprising a carrier adjacent to said wall and a driven shaft rotatably supported by said carrier; motion transmitting means including a second shaft extending from said first control member through said wall and having an end portion coaxial with and adjacent to said driven shaft; reciprocating means including an actuating member located in said first area for moving said carrier and said driven shaft axially toward and away from said second shaft; coupling means comprising cooperating coupling elements provided on said shafts and arranged to establish a driving connection between the shafts in response to movement of said carrier toward said second shaft; and blocking means for normally holding said driven shaft against rotation with reference to said carrier and being operative to release said driven shaft in response to movement of said carrier toward said second shaft so that the driven shaft is released at the time it is coupled to said second shaft, said blocking means comprising a ratchet wheel provided on said driven shaft, a pawl pivotably supported by said carrier, spring means for biasing said pawl in engagement with said ratchet wheel to hold said driven shaft against rotation with reference to said carrier, and rocking means supported by said wall and arranged to pivot said pawl against the bias of said spring means in response to movement of said carrier toward said second shaft.

5. In an apparatus for transmitting motion from a first area to a second area, in combination, a wall situated between and separating said areas from each other; a first and a second control member respectively located in said first and second areas, said second control member comprising a carrier adjacent to said wall and a driven shaft rotatably supported by said carrier; motion transmitting means including a second shaft extending from said first control member through said wall and having an end portion coaxial with and adjacent to said driven shaft; reciprocating means for moving said carrier and said driven shaft axially toward and away from said second shaft, said reciprocating means comprising a plunger operatively connected with said carrier and having a threaded portion, a spindle having a threaded portion meshing with the threaded portion of said plunger, means for rotatably supporting said spindle in said wall, and actuating means located in said first area and arranged to rotate said spindle whereby the plunger moves the carrier axially toward and away from said driven shaft in response to rotation of said spindle in opposite directions; coupling means comprising cooperating coupling elements provided on said shafts and arranged to establish a driving connection between the shafts in response to movement of said carrier toward said second shaft; and blocking means for normally holding said driven shaft against rotation with reference to said carrier and being operative to release said driven shaft in response to movement of said carrier toward said second shaft so that the driven shaft is released at the time it is coupled to said second shaft.

6. A structure as set forth in claim 5, further comprising sealing means rotatably supporting said spindle in said wall.

7. A structure as set forth in claim 6, wherein said wall is provided with an opening and further comprising a tubular housing sealingly received in said opening, said sealing means comprising a sealing plate located in said first area and sealingly secured to one end of said housing and a sealing device mounted in said plate and sealingly surrounding said spindle.

8. In an apparatus for transmitting motion from a first area to a second area, in combination, a wall situated between and separating said areas from each other; a first and a second control member respectively located in said first and second areas, said second control member comprising a carrier adjacent to said wall and a driven shaft rotatably supported by said carrier; motion transmitting means including a second shaft extending from said first control member through said wall and having an end portion coaxial with and adjacent to said driven shaft; reciprocating means including a manually operable actuating member located in said first area for moving said carrier and said driven shaft axially toward and away from said second shaft; coupling means comprising cooperating coupling elements provided on said shafts and arranged to establish a driving connection between the shafts in response to movement of said carrier toward said second shaft; and blocking means for normally holding said driven shaft against rotation with reference to said carrier and being operative to release said driven shaft in response to movement of said carrier toward said second shaft so that the driven shaft is released at the time it is coupled to said second shaft.

9. In an apparatus for transmitting motion from a first area to a second area, in combination, a wall situated between and separating said areas from each other; a first and a second control member respectively located in said first and second areas, said second control member comprising a carrier adjacent to said wall and a driven shaft rotatably supported by said carrier; motion transmitting means including a second shaft extending from said first control member through said wall and having an end portion coaxial with and adjacent to said driven shaft; reciprocating means for moving said carrier and said driven shaft axially toward and away from said second shaft, said reciprocating means comprising a plunger operatively connected with said carrier and parallel to said shafts, said plunger having an end portion distant from said carrier and provided with a tapped bore, a guide cylinder supported by said wall and slidably receiving said end portion of the plunger, a threaded rotary spindle meshing with said plunger, means for holding said spindle against axial movement with reference to said driven shaft; and means for rotating said spindle including an actuating member located in said first area; coupling means comprising cooperating coupling elements provided on said shafts and arranged to establish a driving connection between the shafts in response to movement of said carrier toward said second shaft; and blocking means for normally holding said driven shaft against rotation with reference to said carrier and being operative to release said driven shaft in response to movement of said carrier toward said second shaft so that the driven shaft is released at the time it is coupled to said second shaft.

10. A structure as set forth in claim 9, wherein said carrier is of cylindrical shape and wherein said plunger is coaxial with said carrier.

11. A structure as set forth in claim 9, wherein the means for rotating said spindle further comprises a shaft operatively connected with said spindle and extending to said first area, said last named shaft being detachable from said spindle.

12. In an apparatus for transmitting motion from a first area to a second area, in combination, a wall situated between and separating said areas from each other; a first and a second control member respectively located in said first and second areas, said second control member comprising a holder adjacent to said wall and having a pair of spaced bearing members, a carrier having outwardly extending pins supported by said bearing members, and a driven shaft rotatably mounted in said carrier; motion transmitting means including a second shaft extending from said first control member through said wall and having an end portion coaxial with and adjacent to said driven shaft; reciprocating means including an actuating member located in said first area for moving said holder with said carrier and with said driven shaft axially toward and away from said second shaft; coupling means comprising cooperating coupling elements provided on said shafts and arranged to establish a driving connection between said shafts in response to movement of said holder toward said second shaft; and blocking means for normally holding said driven shaft against rotation with reference to said carrier and being operative to release said driven shaft in response to movement of said holder toward said second shaft so that the driven shaft is released at the time it is coupled to said second shaft.

13. A structure as set forth in claim 12, wherein said carrier is a cylinder and wherein said pins are coaxial to each other and extend radially outwardly from said carrier, said bearing members having sockets for reception of said pins and said sockets being open upwardly so that the carrier may be lifted from said holder.

14. In an apparatus for transmitting motion from a first area to a second area, in combination, a wall situated between and separating said areas from each other; a first and a second control member respectively located in said first and second areas, said second control member comprising a carrier adjacent to said wall and a driven shaft rotatably supported by said carrier; motion transmitting means including a second shaft extending from said first control member through said wall and having an end portion coaxial with and adjacent to said driven shaft; reciprocating means including an actuating member located in said first area for moving said carrier and said driven shaft axially toward and away from said second shaft; coupling means comprising cooperating coupling elements provided on said shafts and arranged to establish a driving connection between the shafts in response to movement of said carrier toward said second shaft; first blocking means for normally holding said driven shaft against rotation with reference to said carrier and being operative to release said driven shaft in response to movement of said carrier toward said second shaft so that the driven shaft is released at the time it is coupled to said second shaft; and second blocking means for holding said second shaft against rotation whenever necessary.

15. A structure as set forth in claim 14, wherein said second blocking means is accessible from said first area so as to be operable by persons standing next to said wall.

16. An apparatus for transmitting motion from a first area to a second area, particularly for transmitting motion from a safe area to a dangerous area, comprising a wall situated between and separating said areas from each other; a first and a second control member respectively located in said first and second areas, said second control member comprising a carrier adjacent to said wall and a plurality of parallel driven shafts rotatably supported by said carrier, said first control member having an equal number of rotary driver shafts each coaxial with but spaced from one of said driven shafts; motion transmitting means including intermediate shafts connected with said driver shafts, said intermediate shafts extending through said wall and having end portions adjacent to the corresponding driven shafts; reciprocating means including an actuating member located in said first area for moving said carrier and said driven shaft axially toward and away from said intermediate shafts; coupling means comprising cooperating coupling elements provided on said driven and intermediate shafts and arranged to establish driving connections between said intermediate and driven shafts in response to movement of said carrier toward said intermediate shafts; and blocking means for normally holding said driven shafts against rotation with reference to said carrier and being operative to release said driven shafts in response to movement of said carrier toward said intermediate shafts so that the driven shafts are released at the time they are coupled with the corresponding intermediate shafts.

17. An apparatus for transmitting motion from a first area to a second area, particularly for transmitting motion from a safe area to a dangerous area, comprising a wall situated between and separating said areas from each other; a first and a second control member respectively located in said first and second areas, said second control member comprising a carrier adjacent to said wall and a plurality of parallel driven shafts rotatably supported by said carrier, said first control member having an equal number of rotary driver shafts each coaxial with but spaced from one of said driven shafts; motion transmitting means including intermediate shafts connected with said driver shafts, said intermediate shafts extending through said wall and having end portions adjacent to the corresponding driven shafts; reciprocating means including an actuating member located in said first area for moving said carrier and said driven shafts axially toward and away from said intermediate shafts; coupling means comprising cooperating coupling elements provided on said driven and intermediate shafts and arranged to establish driving connections between said intermediate and driven shafts in response to movement of said carrier toward said intermediate shafts; first blocking means for normally holding said driven shafts against rotation with reference to said carrier and being operative to release said driven shafts in response to movement of said carrier toward said intermediate shafts so that the driven shafts are released at the time they are coupled with the corresponding intermediate shafts; and second blocking means for blocking said driver shafts at such times when said intermediate shafts are disengaged from the corresponding driven shafts.

References Cited by the Examiner

UNITED STATES PATENTS 2,003,795   6/1935   Wilsing.

DAVID J. WILLIAMOWSKY, *Primary Examiner.*

B. W. WYCHE III, *Assistant Examiner.*